(12) United States Patent
Fang (10) Patent No.: US 8,786,791 B2
(45) Date of Patent: Jul. 22, 2014

(54) DISPLAY DEVICE AND BACKLIGHT MODULE THEREOF

(75) Inventor: Chong-Yang Fang, Taichung (TW)

(73) Assignees: Dongguan Masstop Liquid Crystal Display Co., Ltd., Dongcheng District, Dongguan, Guangdong Province (CN); Wintek Corporation, Tanzi Dist., Taichung (TW)

( * ) Notice: Subject to any disclaimer, the term of this patent is extended or adjusted under 35 U.S.C. 154(b) by 0 days.

(21) Appl. No.: 13/485,931

(22) Filed: Jun. 1, 2012

(65) Prior Publication Data

US 2012/0307181 A1  Dec. 6, 2012

(30) Foreign Application Priority Data

Jun. 1, 2011 (TW) .............................. 100119186 A (51) Int. Cl.
*G02F 1/1335* (2006.01)
(52) U.S. Cl.
USPC .............................................. 349/15; 349/62
(58) Field of Classification Search
CPC .................................. G02B 27/48; G06K 7/10
USPC ....................................................... 349/62, 15
See application file for complete search history.

(56) References Cited

U.S. PATENT DOCUMENTS

| | | | | |
|---|---|---|---|---|
| 6,049,424 | A * | 4/2000 | Hamagishi | 359/464 |
| 7,058,252 | B2 * | 6/2006 | Woodgate et al. | 385/16 |
| 2005/0122048 | A1 * | 6/2005 | Kang et al. | 313/635 |
| 2006/0087866 | A1 | 4/2006 | Ng | |
| 2007/0035672 | A1 | 2/2007 | Shestak | |
| 2008/0174848 | A1 | 7/2008 | Kim | |
| 2010/0073768 | A1 * | 3/2010 | Kim et al. | 359/463 |
| 2011/0025956 | A1 | 2/2011 | Usukura | |

FOREIGN PATENT DOCUMENTS

| | | |
|---|---|---|
| CN | 1539095 A | 10/2004 |
| CN | 1763604 A | 4/2006 |
| CN | 1908734 A | 2/2007 |
| CN | 101231414 A | 7/2008 |
| CN | 101999093 A | 3/2011 |
| TW | I264600 | 10/2006 |
| TW | 200741287 | 11/2007 |
| TW | 201031969 | 9/2010 |
| TW | 201044345 | 12/2010 |
| WO | 9534017 | 12/1995 |

* cited by examiner

*Primary Examiner* — Lucy Chien
(74) *Attorney, Agent, or Firm* — Winston Hsu; Scott Margo (57) ABSTRACT

A display device and a backlight module are provided in the present invention. The display device includes the backlight module and a liquid crystal display panel. The backlight module, which is used to provide a backlight source for the liquid crystal display panel, includes a luminant device and a micro-lens array. The luminant device is disposed under the liquid crystal display panel, and the luminant device has a plurality of first luminant regions and a plurality of second luminant regions. The micro-lens array is disposed between the luminant device and the liquid crystal display panel. The micro-lens array includes a plurality of micro-lenses, and each of the micro-lenses overlaps at least one first luminant region and at least one second luminant region in a direction perpendicular to the liquid crystal display panel.

20 Claims, 13 Drawing Sheets

DISPLAY DEVICE AND BACKLIGHT MODULE THEREOF

BACKGROUND OF THE INVENTION

1. Field of the Invention

The present invention relates to a display device and a backlight module thereof, and more particularly, to a backlight module providing a backlight source to a liquid crystal display panel for generating a two-dimensional/three-dimensional switchable display effect and a display device including the backlight module.

2. Description of the Prior Art

The principle of stereoscopic display technology includes respectively delivering different images to a left eye and a right eye of a viewer, giving the viewer a feeling of gradation and depth in the images, and generating the stereoscopic effect in the cerebrum of the viewer by the analyzing and overlapping of images separately received by the left eye and the right eye.

In general, the stereoscopic display technologies may be substantially divided into two major types, which are the glasses type and the naked-eye type (autostereoscopic type). Recently, the parallax barrier type stereoscopic display technology and the lenticular lens type stereoscopic display technology are the popular naked-eye type stereoscopic display technologies. In the parallax barrier type and the lenticular lens type stereoscopic display technologies, stripe barrier patterns or lenticular lenses are disposed in front of a general display panel, and one eye of a viewer may receive images different from those received by another eye of the viewer. The different images received respectively by two eyes of the viewer may be integrated in the viewer's brain to generate stereoscopic display effect. In the conventional naked-eye type stereoscopic display technologies, two adjacent pixels are used to respectively provide different images to the left eye and the right eye at the same time resulting in the perceived resolution becoming lower than the actual resolution of the display panel, and the display quality may then be seriously influenced.

SUMMARY OF THE INVENTION

It is one of the objectives of the present invention to provide a display device and a backlight module thereof. The backlight module is used to provide a backlight source to a liquid crystal display panel. A micro-lens array is disposed between the luminant device and the liquid crystal display panel for providing different display images to two eyes of a viewer, and a purpose of presenting a naked-eye two-dimensional/three-dimensional switchable display effect with high resolution may then be achieved.

A preferred embodiment of the present invention provides a backlight module. The backlight module is used to provide a backlight source for a liquid crystal display panel. The backlight module includes a luminant device and a micro-lens array. The luminant device is disposed under the liquid crystal display panel, and the luminant device includes a plurality of first luminant regions and a plurality of second luminant regions. Each of the first luminant regions and each of the second luminant regions are disposed alternately along a first direction. The micro-lens array is disposed between the luminant device and the liquid crystal display panel. The micro-lens array includes a plurality of micro-lenses, and each of the micro-lenses overlaps at least one first luminant region and at least one second luminant region in a direction perpendicular to the liquid crystal display panel. Each of the first luminant regions provides light in a first display direction via a partial area of the corresponding micro-lens, and each of the second luminant regions provides light in a second display direction via a partial area of the corresponding micro-lens.

A preferred embodiment of the present invention provides a display device. The display device includes a liquid crystal display panel and a backlight module disposed under the liquid crystal display panel. The backlight module is used to provide a backlight source for the liquid crystal display panel. The backlight module includes a luminant device and a micro-lens array. The luminant device is disposed under the liquid crystal display panel, and the luminant device includes a plurality of first luminant regions and a plurality of second luminant regions. Each of the first luminant regions and each of the second luminant regions are disposed alternately along a first direction. The micro-lens array is disposed between the luminant device and the liquid crystal display panel. The micro-lens array includes a plurality of micro-lenses, and each of the micro-lenses overlaps at least one first luminant region and at least one second luminant region in a direction perpendicular to the liquid crystal display panel. Each of the first luminant regions provides light in a first display direction via a partial area of the corresponding micro-lens, and each of the second luminant regions provides light in a second display direction via a partial area of the corresponding micro-lens.

In the present invention, by disposing the micro-lens array over the luminant device and controlling conditions of providing light from each of the luminant regions in the luminant device, the light may be provided in different display directions. The backlight module of the present invention may be combined with a liquid crystal display panel for providing a naked-eye two-dimensional/three-dimensional switchable display effect without lowering the display resolution.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
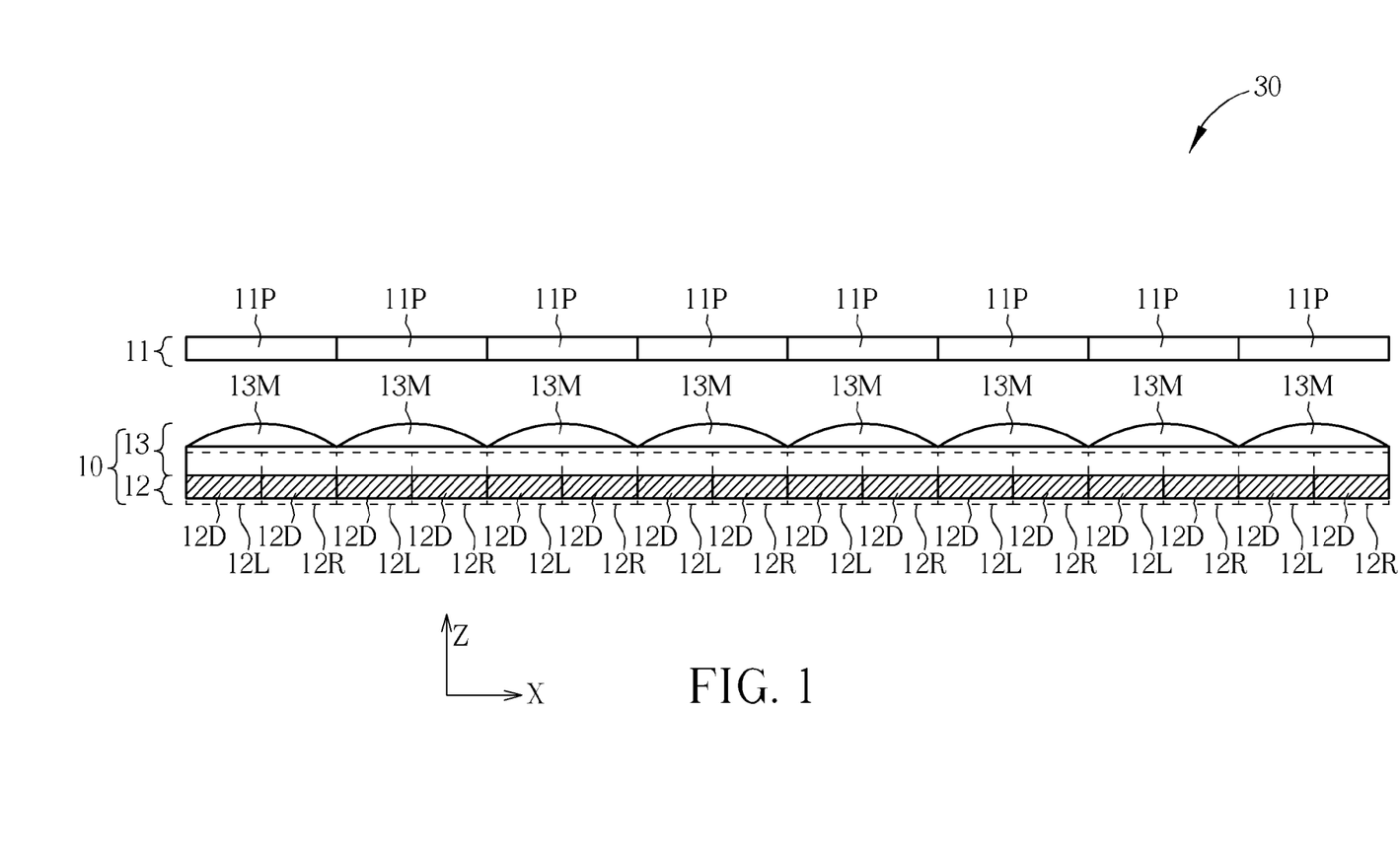
FIG. 1 and FIG. 2 are schematic diagrams illustrating a display device and a backlight module of the display device according to a preferred embodiment of the present invention.
Figure 2:
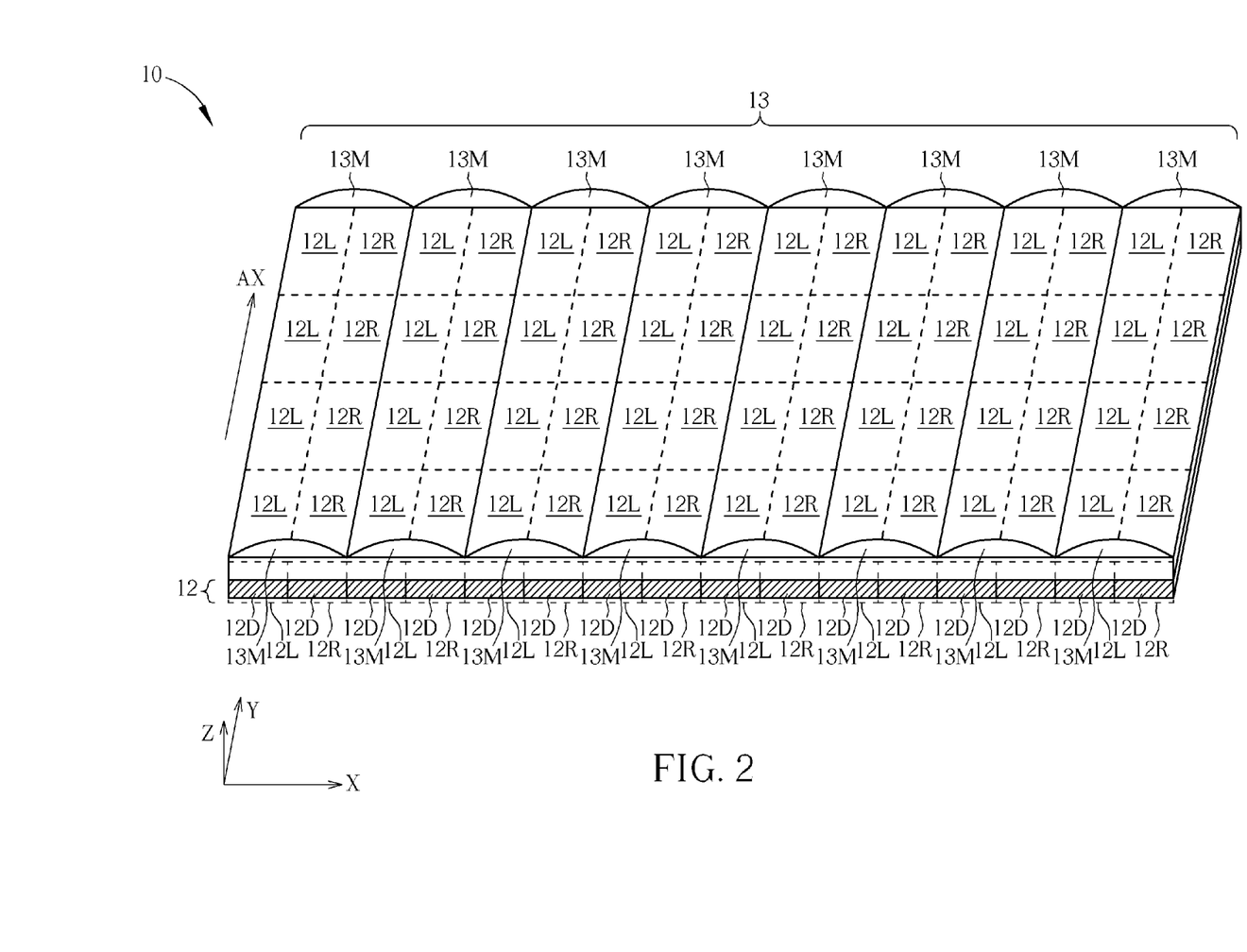

Please refer to FIG. 1 and FIG. 2, which are schematic diagrams illustrating a display device and a backlight module of the display device according to a preferred embodiment of the present invention. Please note that the figures are only for illustration and the figures may not be to scale. The scale may be further modified according to different design considerations.

As shown in FIG. 1, the preferred embodiment of the present invention provides a display device 30. The display device 30 includes a liquid crystal display panel 11 and a backlight module 10. The backlight module 10 is disposed under the liquid crystal display panel 11, and the backlight module 10 is used to provide a backlight source for the liquid crystal display panel 11. The backlight module 10 includes a luminant device 12 and a micro-lens array 13. The liquid crystal display panel 11 includes a plurality of pixels 11P. The micro-lens array 13 is disposed between the luminant device 12 and the liquid crystal display panel 11. The luminant device 12 includes a plurality of first luminant regions 12L and a plurality of second luminant regions 12R. Each of the first luminant regions 12L and each of the second luminant regions 12R are disposed alternately along a first direction X. The micro-lens array 13 includes a plurality of micro-lenses 13M. Each of the pixels 11P of the liquid crystal display panel 11 and each of the micro-lenses 13M overlap each other along a direction Z perpendicular to the liquid crystal display panel 11, and each of the micro-lenses 13M overlaps at least one adjacent first luminant region 12L and at least one adjacent second luminant region 12R in the direction Z. A display resolution of the display device 30 may not be reduced because a size of each of the first luminant regions 12L and the adjacent second luminant region 12R may be controlled within an area of each the corresponding pixel 11P. Additionally, as shown in FIG. 2, the first luminant regions 12L are disposed along a second direction Y, and the second luminant regions 12R are also disposed along the second direction Y.

In the present invention, each of the micro-lenses 13M may include lenses such as a lenticular lens or a linear Fresnel lens, but not limited thereto. In addition, each of the micro-lenses 13M may have an axis direction AX, and the axis direction AX may be substantially parallel to the second direction Y. In this embodiment, the first direction X is not parallel to the second direction Y, and the first direction X is preferably perpendicular to the second direction Y, but not limited thereto. In the backlight module 10 of this embodiment, the luminant device 12 may further include a plurality of light emitting units 12D respectively disposed in the first luminant regions 12L and the second luminant regions 12R. Each of the light emitting units may include a light emitting diode (LED) or an organic light emitting diode (OLED), but the present invention is not limited to this and other appropriate light emitting units may be employed in the luminant device 12. In other words, in this embodiment, the luminant device 12 may include an LED array or an OLED array, but not limited thereto. It is worth noticing that, as shown in FIG. 1, each of the pixels 11P is disposed corresponding to one first luminant region 12L and one second luminant region 12R, but the present invention is not limited to this. The relative size and the relative allocation of the pixels 11P, the first luminant regions 12L, and the second luminant regions 12R may be further modified for different design considerations.

Figure 3:
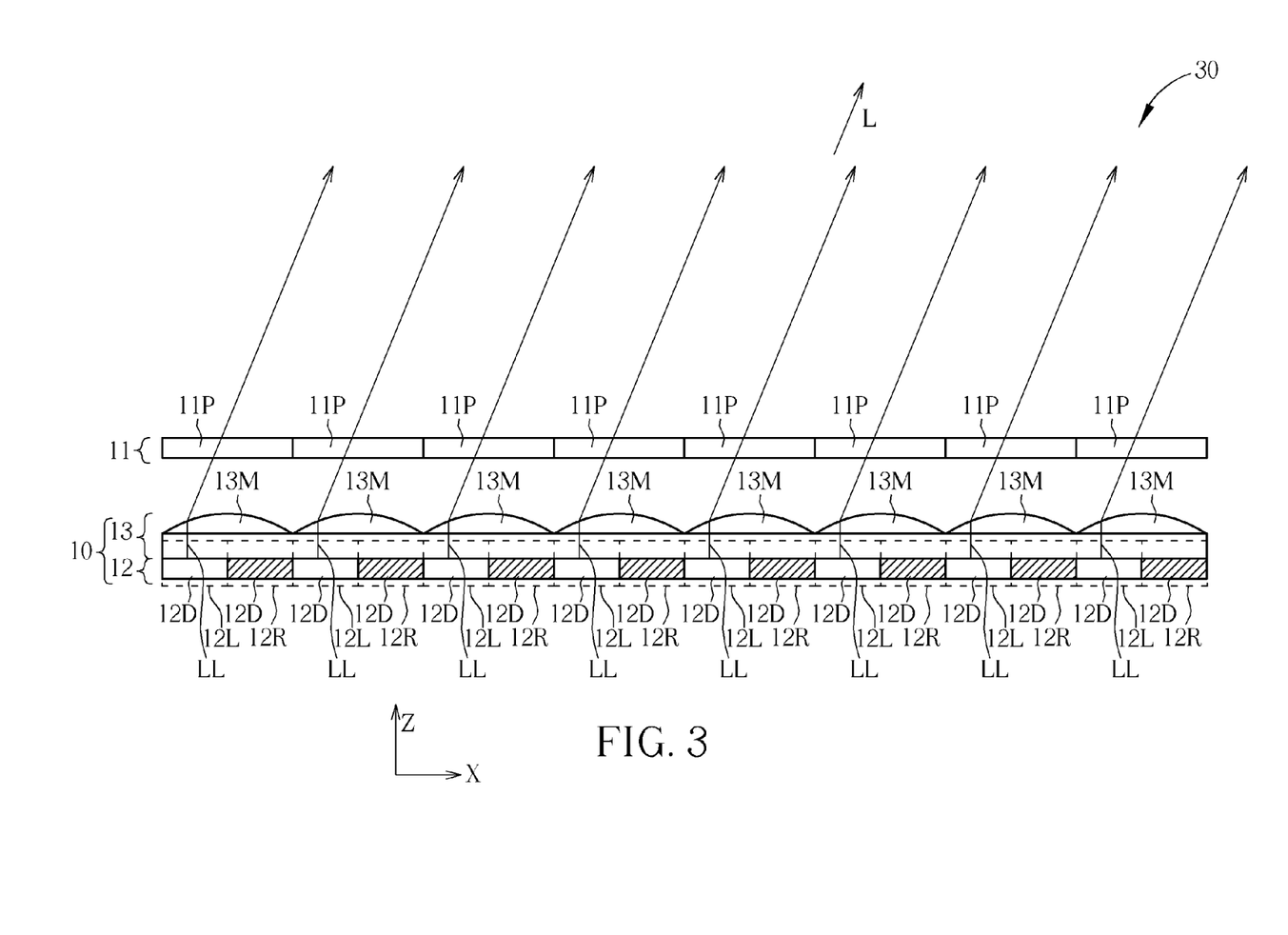
FIGS. 3-5 are schematic diagrams illustrating light providing approaches of a backlight module according to a preferred embodiment of the present invention.
Figure 4:
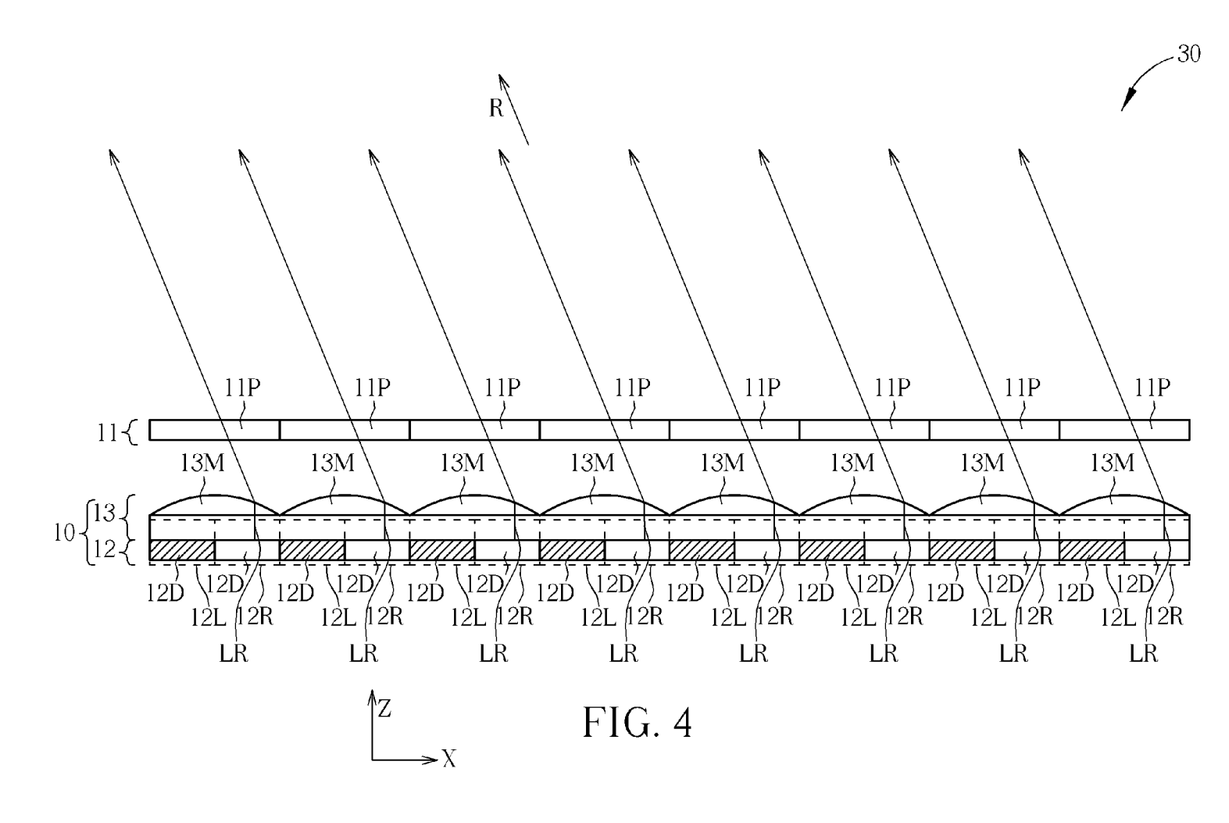
Figure 5:
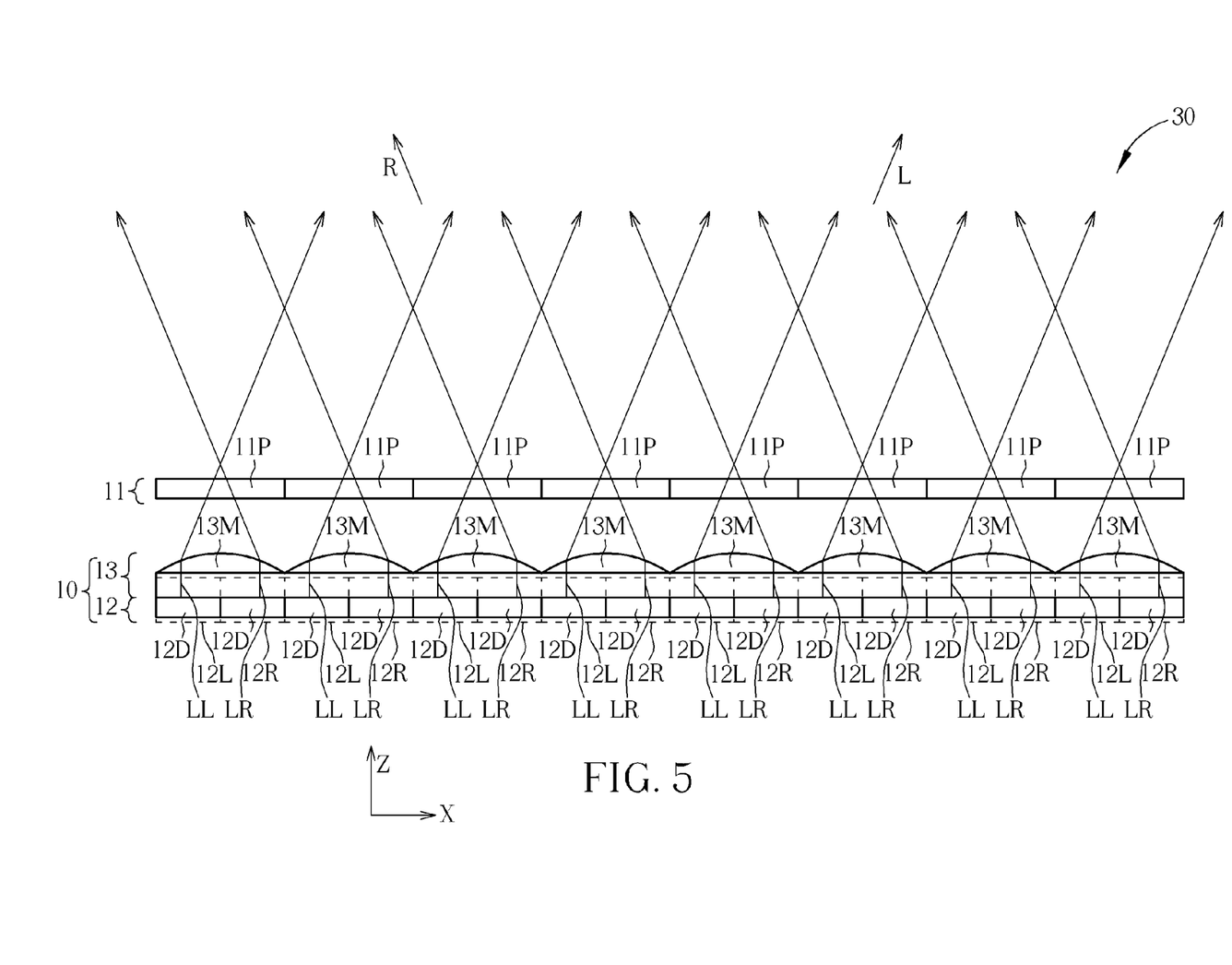

Please refer to FIGS. 3-5 that are schematic diagrams illustrating light providing approaches of the backlight module according to the preferred embodiment of the present invention. FIG. 3 and FIG. 4 are schematic diagrams illustrating the light providing approaches of the backlight module under a stereoscopic display mode of the display device. FIG. 5 is a schematic diagram illustrating the light providing approaches of the backlight module under a two-dimensional display mode of the display device. As shown in FIG. 3, each of the first luminant regions 12L may provide light in a first display direction L via a partial area of the corresponding micro-lens 13M. For further description, in this embodiment, light LL generated from each of the first luminant regions 12L may be changed toward the first display direction L after passing through the partial area of the corresponding micro-lens 13M according to an optical property of the corresponding micro-lens 13M, for providing a light source in the first display direction L to the liquid crystal display panel 11. In other words, under a combination of the backlight module 10 and the liquid crystal display panel 11, the light in the first display direction L, which is generated by each of the first luminant regions 12L via the partial area of the corresponding micro-lens 13M, may be employed to present display images in the first display direction L by passing through the corresponding pixels 11P.

According to the same rule, as shown in FIG. 4, each of the second luminant regions 12R may provide light in a second display direction R via a partial area of the corresponding micro-lens 13M, i.e. light LR generated from each of the second luminant regions 12R may be changed toward the second display direction R after passing through the partial area of the corresponding micro-lens 13M according to an optical property of the corresponding micro-lens 13M, for providing a light source in the second display direction R to the liquid crystal display panel 11. Each of the first luminant regions 12L mentioned above and the adjacent second luminant region 12R correspond to an identical pixel 11P, and the display images in the first display direction L and the display images in the second display direction R are generated at different time. Accordingly, a scan frequency alternating between the first luminant regions 12L and the second luminant regions 12R is preferably equal to or higher than a frame rate of the liquid crystal display panel 11 for providing different display images to a left eye and a right eye of a viewer and generating a three-dimensional display effect.

As shown in FIG. 5, each of the first luminant regions 12L and each of the second luminant region 12R may respectively provide light in the first display direction L and in the second display direction R simultaneously for generating a two-dimensional display effect by passing through the liquid crystal display panel 11. It is worth noticing that, in this embodiment, each of the lights LL and each of the lights LR may be changed toward the pixel 11P corresponding to the micro-lens 13M in the direction Z after passing through the micro-lens 13M, but the present invention is not limited to this and the relative allocations of the pixel 11P, which the lights LL and the lights LR are led to, may be further modified according to requirements such as varying viewing angles and varying viewing distances. In addition, the display effect may also be optimized by modifying the optical properties of the micro-lenses 13M, a coverage condition of the micro-lenses 13M, or a distance between the micro-lenses 13M and the liquid crystal display panel 11. For example, when R is regarded as a radius of each the micro-lens 13M, W is regarded as a width of each the micro-lens 13M in the first direction X, and D is regarded as a distance between the liquid crystal display panel 11 and the micro-lenses 13M, an equation (1) listed below may be used to modify the distance and the properties of the micro-lenses 13M for ensuring that the light from all the first luminant regions 12L or all the second luminant regions 12R may cover all the pixels 11P in the liquid crystal display panel 11.

$$D \propto R \cdot W \qquad (1)$$

Figure 6:
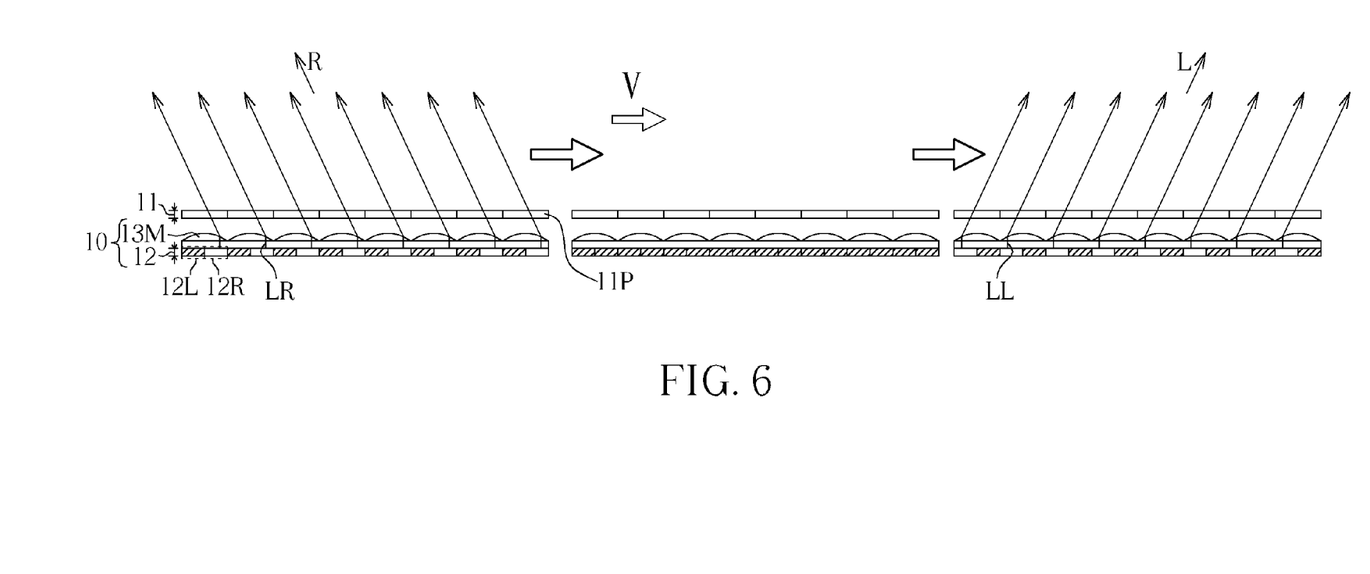
FIG. 6 and FIG. 7 are schematic diagrams illustrating display approaches of a display device according to a preferred embodiment of the present invention.
Figure 7:
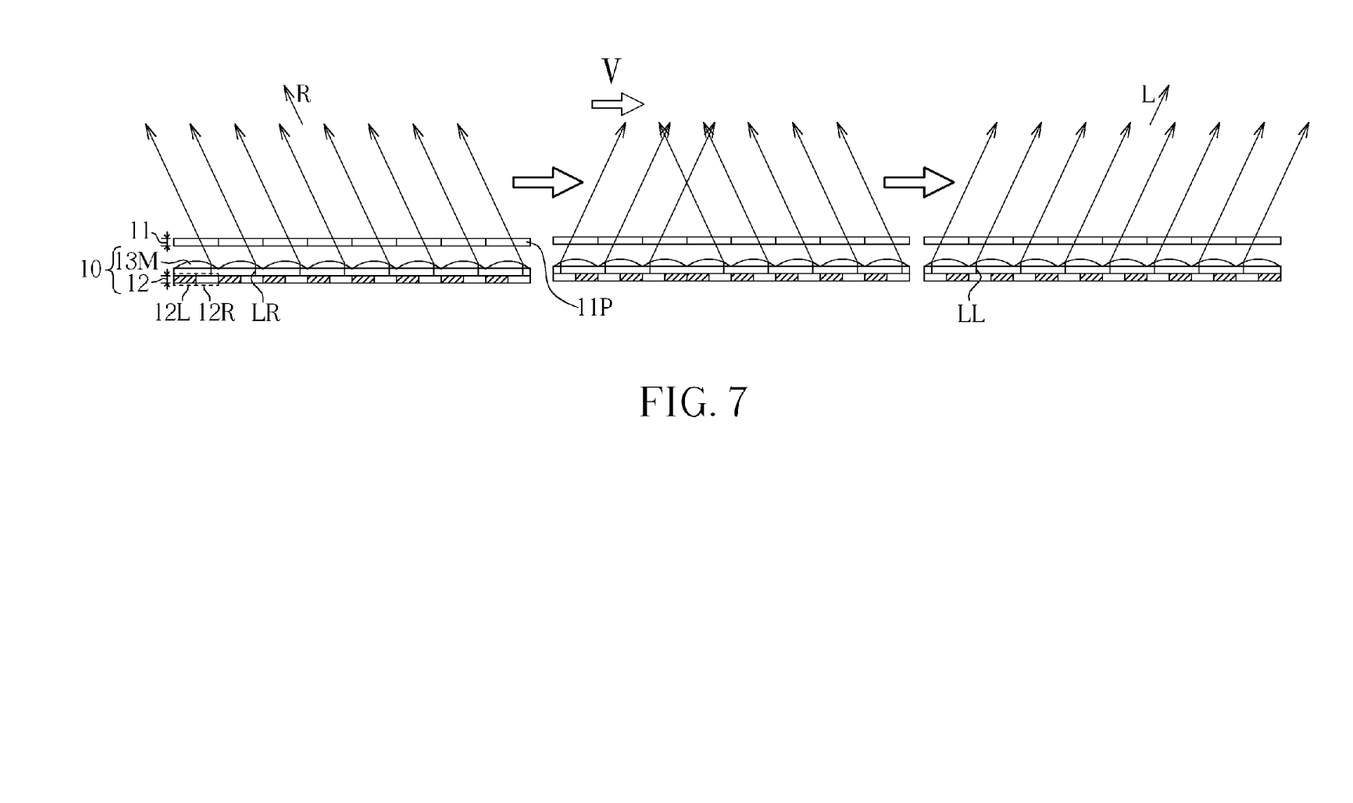

Please refer to FIG. 6, FIG. 7, and FIG. 1. FIG. 6 and FIG. 7 are schematic diagrams illustrating display approaches of the display device according to the preferred embodiment of the present invention. As shown in FIG. 6, under a first stereoscopic display mode of the display device 30, the second luminant regions 12R may be turned on for generating display images in the second display direction R via the pixels 11P of the liquid crystal display panel 11, meanwhile, each of the first luminant regions 12L is turned off. Comparatively, under the first stereoscopic display mode of the display device 30, the first luminant regions 12L may be turned on for generating display images in the first display direction L via the pixels 11P of the liquid crystal display panel 11, meanwhile, each of the second luminant regions 12R is turned off. The display images are refreshed by controlling the pixels 11P of the liquid crystal display panel 11. Therefore, when refreshing the display images of the display device 30 from one display direction to another display direction, each of the first luminant regions 12L and each of the second luminant regions 12R may have to finish being turned on or being turned off within an image refreshing time, and display conditions of each the pixel 11P in the liquid crystal display panel 11 may also have to finish being updated within the image refreshing time.

Under the first stereoscopic display mode, each of the first luminant regions 12L and each of the second luminant regions 12R are turned off as the display conditions of the pixels 11P in the liquid crystal display panel 11 are updated along a updating direction V within the image refreshing time. Each of the first luminant regions 12L or each of the second luminant regions 12R may be turned on after the display images of the liquid crystal display panel 11 finish being updated. In other words, under the first stereoscopic display mode, a timing of providing light along the first display direction L from the first luminant regions 12L may be separated from a timing of providing light along the second display direction R from the second luminant regions 12R. Under the first stereoscopic display mode, all of the first luminant regions 12L can be turned on while all of the second luminant regions 12R can be turned off, or all of the second luminant regions 12R can be turned on while all of the first luminant regions 12L can be turned off, a driving method of the backlight module 10 may therefore become simple, and purposes of simplifying related designs and reducing related cost may be then achieved.

Figure 8:
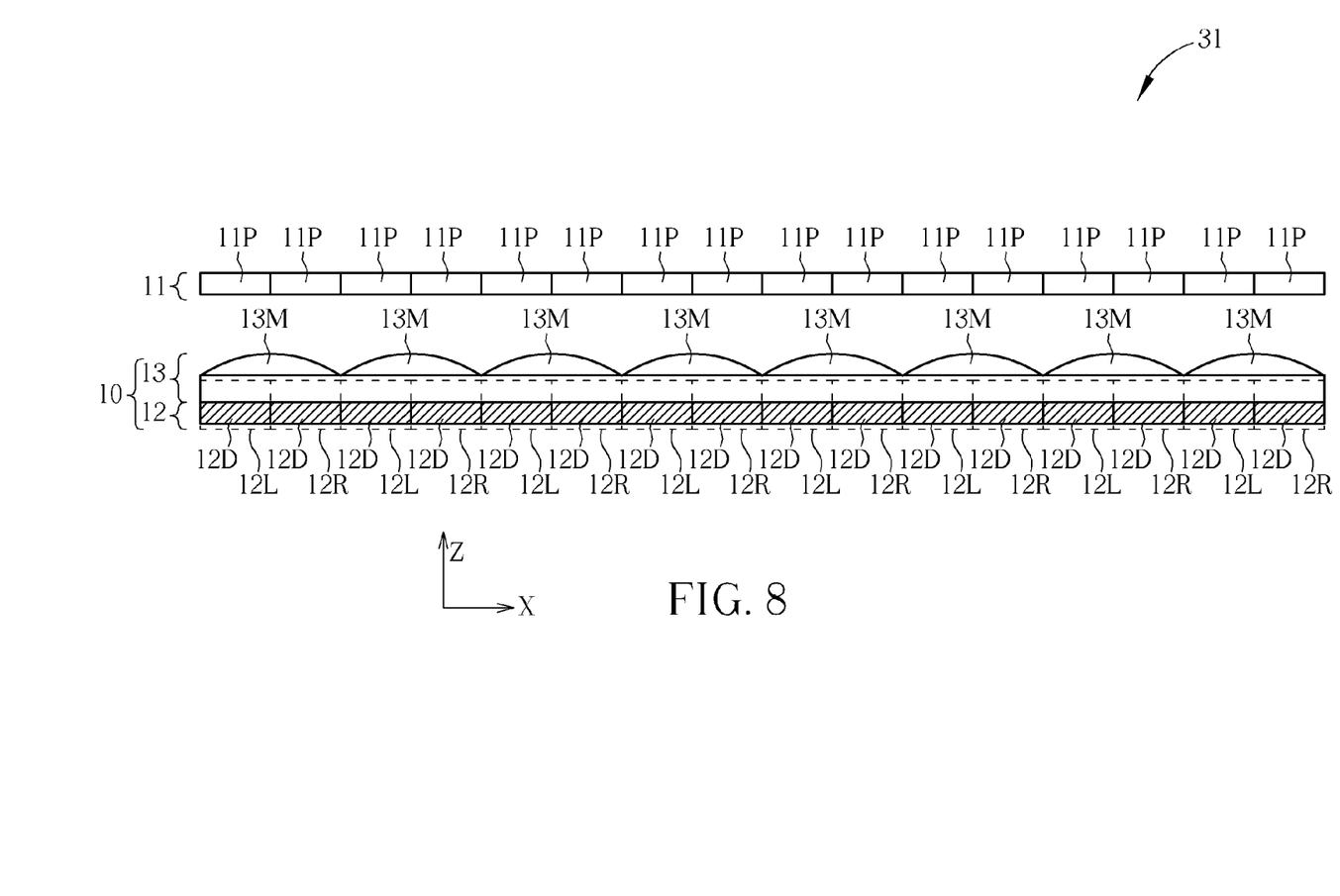
FIG. 8 is a schematic diagram illustrating a display device and a backlight module of the display device according to another preferred embodiment of the present invention.

As shown in FIG. 7, under a second stereoscopic display mode, when refreshing the display images of the display device 30 from one display direction to another display direction, each of the first luminant regions 12L and each of the second luminant regions 12R may have to finish being turned on or being turned off within an image refreshing time, and display conditions of each the pixel 11P in the liquid crystal display panel 11 may also have to finish being updated within the image refreshing time. As shown in FIG. 8, under the second stereoscopic display mode, each of the first luminant regions 12L and the corresponding second luminant regions 12R are turned on or turned off simultaneously along a updating direction V for providing the light in different directions to the corresponding pixels 11P as the display conditions of the pixels 11P in the liquid crystal display panel 11 are updated along the updating direction V within the image refreshing time. In other words, under the second stereoscopic display mode, a timing of providing light along the first display direction L from each of the first luminant regions 12L and a timing of providing light along the second display direction R from the second luminant region 12R adjacent to the first luminant region 12L may partially overlap each other.

Under the second stereoscopic display mode, each of the first luminant regions 12L and each of the second luminant regions 12R are turned on or turned off simultaneously with the corresponding pixels 11P, and the presenting luminance may therefore be enhanced. Additionally, in an alternative embodiment of the present invention, each of the first luminant regions 12L or each of the second luminant regions 12R in a same row may be turned on after all the corresponding pixels 11P in the row finish being updated, and the influence on the presenting luminance, which may be generated by turning off the backlight module 10 as the liquid crystal display panel 11 refreshes display images under the first stereoscopic display mode, may be then reduced.

Please refer to FIG. 8. FIG. 8 is a schematic diagram illustrating a display device and a backlight module of the display device according to another preferred embodiment of the present invention. As shown in FIG. 8, the preferred embodiment of the present invention provides a display device 31. The display device 31 includes a backlight module 10 and a liquid crystal display panel 11. The difference between the display device 31 and the display device 30 mentioned above is that each of the pixels 11P corresponds to one of the first luminant regions 12L or one of the second luminant regions 12R for being compatible with panels, luminant devices, and micro-lenses in different sizes. Additionally, the light providing approaches, the display approaches, and the approaches of modifying the micro-lenses of this embodiment are similar to the embodiment mentioned above and will not be redundantly described.

Figure 9:
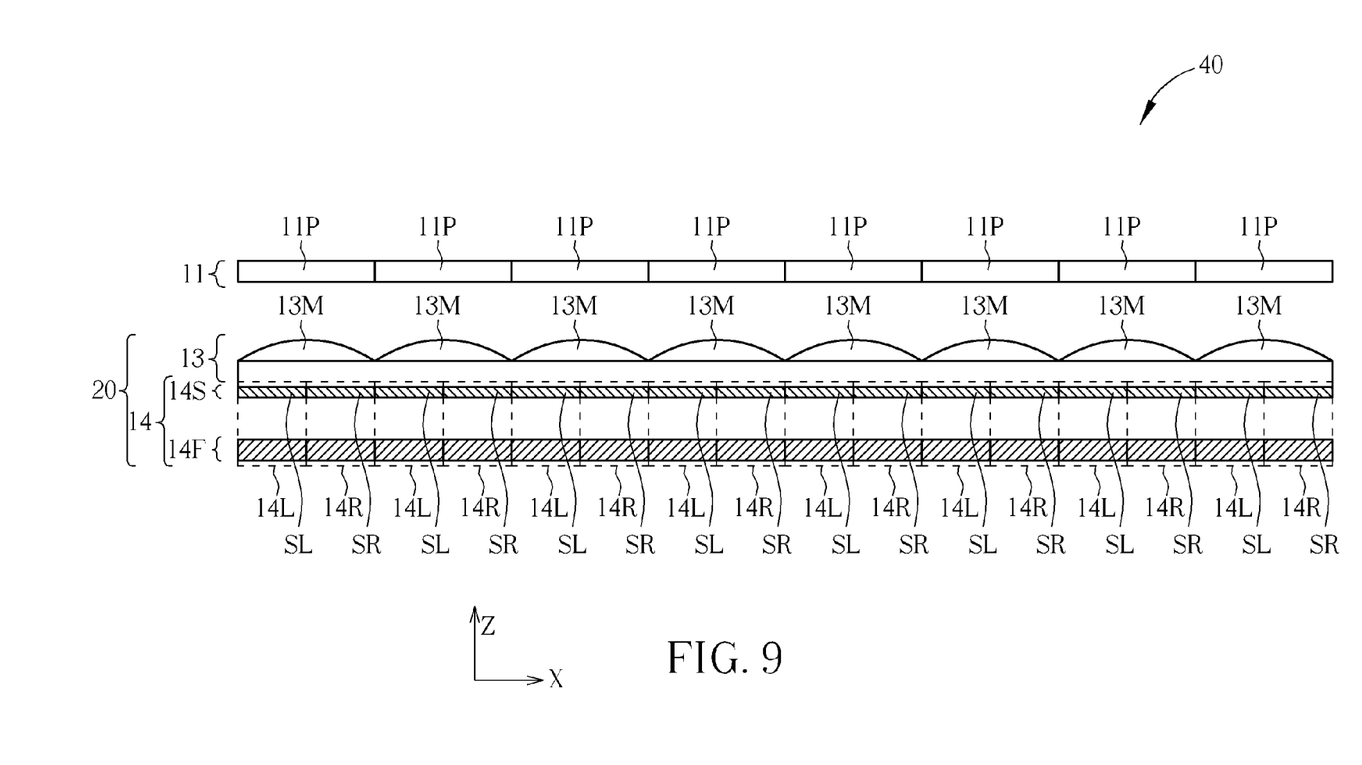
FIG. 9 is a schematic diagram illustrating a display device and a backlight module of the display device according to another preferred embodiment of the present invention.

Please refer to FIG. 9, which is a schematic diagram illustrating a display device and a backlight module of the display device according to another preferred embodiment of the present invention. As shown in FIG. 9, the preferred embodiment of the present invention provides a display device 40. The display device 40 includes a backlight module 20 and a liquid crystal display panel 11. The backlight module 20 is used to provide a backlight source for the liquid crystal display panel 11. The backlight module 20 includes a luminant device 14 and a micro-lens array 13. The luminant device 14 is disposed under the liquid crystal display panel 11, and the luminant device 14 includes a plurality of first luminant regions 14L and a plurality of second luminant regions 14R. The micro-lens array 13 is disposed between the luminant device 14 and the liquid crystal display panel 11. The micro-lens array 13 includes a plurality of micro-lenses 13M. Each of the micro-lenses 13M overlaps at least one first luminant region 14L and at least one second luminant region 14R in the direction Z perpendicular to the liquid crystal display panel 11. In addition, the relative allocations and the relationships between each of the first luminant regions 14L, each of the second luminant regions 14R, and each of the micro-lenses 13M in this embodiment are similar to the embodiment mentioned above and will not be redundantly described.

The luminant device 14 in this embodiment includes a flat light source device 14F and a barrier panel 14S. The barrier panel 14S includes a plurality of first barrier pixels SL respectively disposed in the first luminant regions 14L and a plurality of second barrier pixels SR respectively disposed in the second luminant regions 14R. Each of the first barrier pixels SL is employed for selectively blocking light from each of the first luminant regions 14L, and each of the second barrier pixels SR is employed for selectively blocking light from each of the second luminant regions 14R. Specifically, under a stereoscopic display mode, each of the first barrier pixels SL may be turned on for blocking the light from the corresponding first luminant region 14L, and each of the second barrier pixels SR may be turned on for blocking the light from the corresponding second luminant region 14R. Under a two-dimensional display mode, the first barrier pixels SL and the second barrier pixels SR may be turned off allowing the light from the first luminant regions 14L and the second luminant regions 14R to pass through.

In other words, in this embodiment, each of the first barrier pixels SL and each of the second barrier pixels SR of the barrier panel 14S may be controlled for presenting a barrier display mode or a transparent display mode. When each of the first barrier pixels SL and each of the second barrier pixels SR, which are respectively corresponding to each of the first luminant regions 14L and each of the second luminant regions 14R, are controlled in the transparent display mode, light generated from the flat light source device 14F may pass through the first barrier pixels SL and the second barrier pixels SR, and the corresponding first luminant regions 14L and the corresponding second luminant regions 14R are turned on and may then be able to provide light to the liquid crystal panel 11. Comparatively, when each of the first barrier pixels SL and each of the second barrier pixels SR, which are respectively corresponding to each of the first luminant regions 14L and each of the second luminant regions 14R, are controlled in the barrier display mode, the light generated from the flat light source device 14F may not be able to pass through the first barrier pixels SL and the second barrier pixels SR, and the corresponding first luminant regions 14L and the corresponding second luminant regions 14R are turned off and may not be able to provide light to the liquid crystal panel 11. Additionally, in this embodiment, the barrier panel 14S may include a liquid crystal panel, but the barrier panel 14S of the present invention is not limited to this and may include other appropriate devices such as an e-ink panel or an electrowetting panel for selectively blocking the light from each luminant region.

Figure 10:
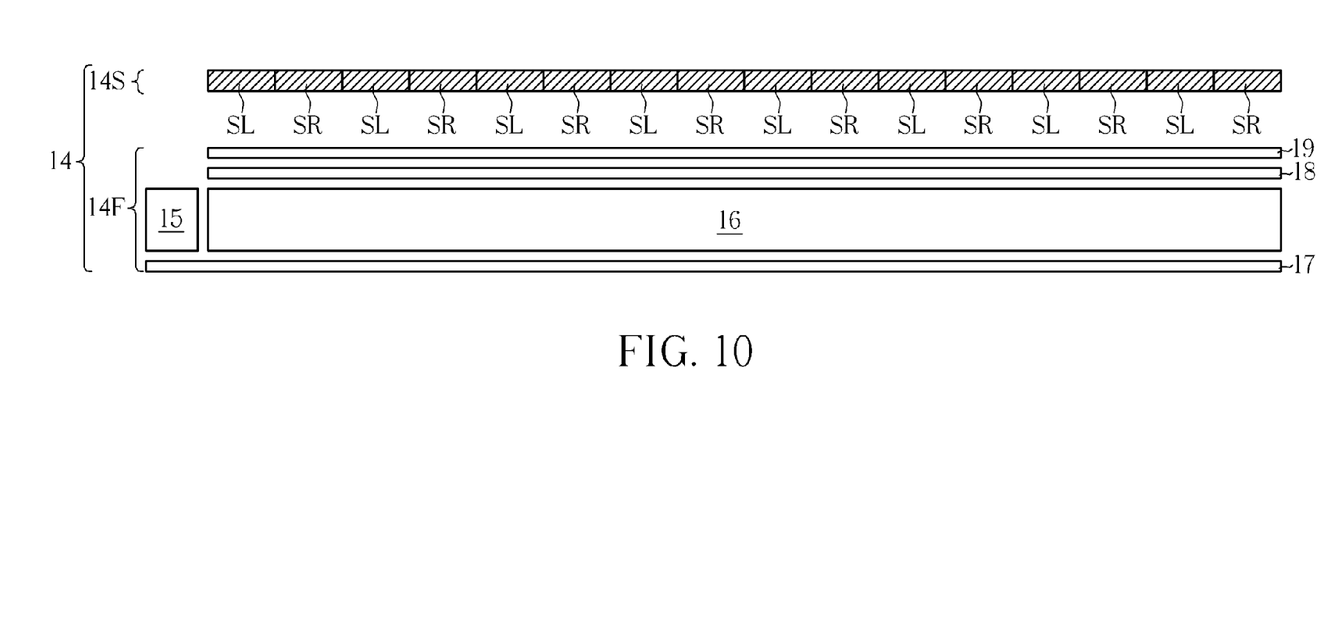
FIG. 10 is a schematic diagram illustrating a luminant device of a backlight module according to a preferred embodiment of the present invention.

Please refer to FIG. 10. FIG. 10 is a schematic diagram illustrating a luminant device of a backlight module according to a preferred embodiment of the present invention. As shown in FIG. 10, the luminant device 14 includes the flat light source device 14F and the barrier panel 14S. The flat light source device 14F may include a light source 15, a light guide sheet 16, a reflective sheet 17, a diffusion sheet 18, and a prism sheet 19 for enhancing the uniformity of the light generated by the flat light source device 14F and enhancing the luminant efficacy of the flat light source device 14F, but the present invention is not limited to this and numbers of the components in the flat light source device 14F described above may be increased or reduced and the relative allocations of the components may also be further modified according to different design considerations. It is worth noticing that the luminant device 14 of this embodiment is a side light type luminant device, and the light source 15 is disposed on a side of the light guide sheet 16, but the present invention is not limited to this and other types of the luminant devices such as a direct light type luminant device may also be employed in the present invention. Additionally, the light source 15 of this embodiment may include light emitting diodes, cold cathode fluorescent lamp (CCFL), or other appropriate light sources.

Figure 11:
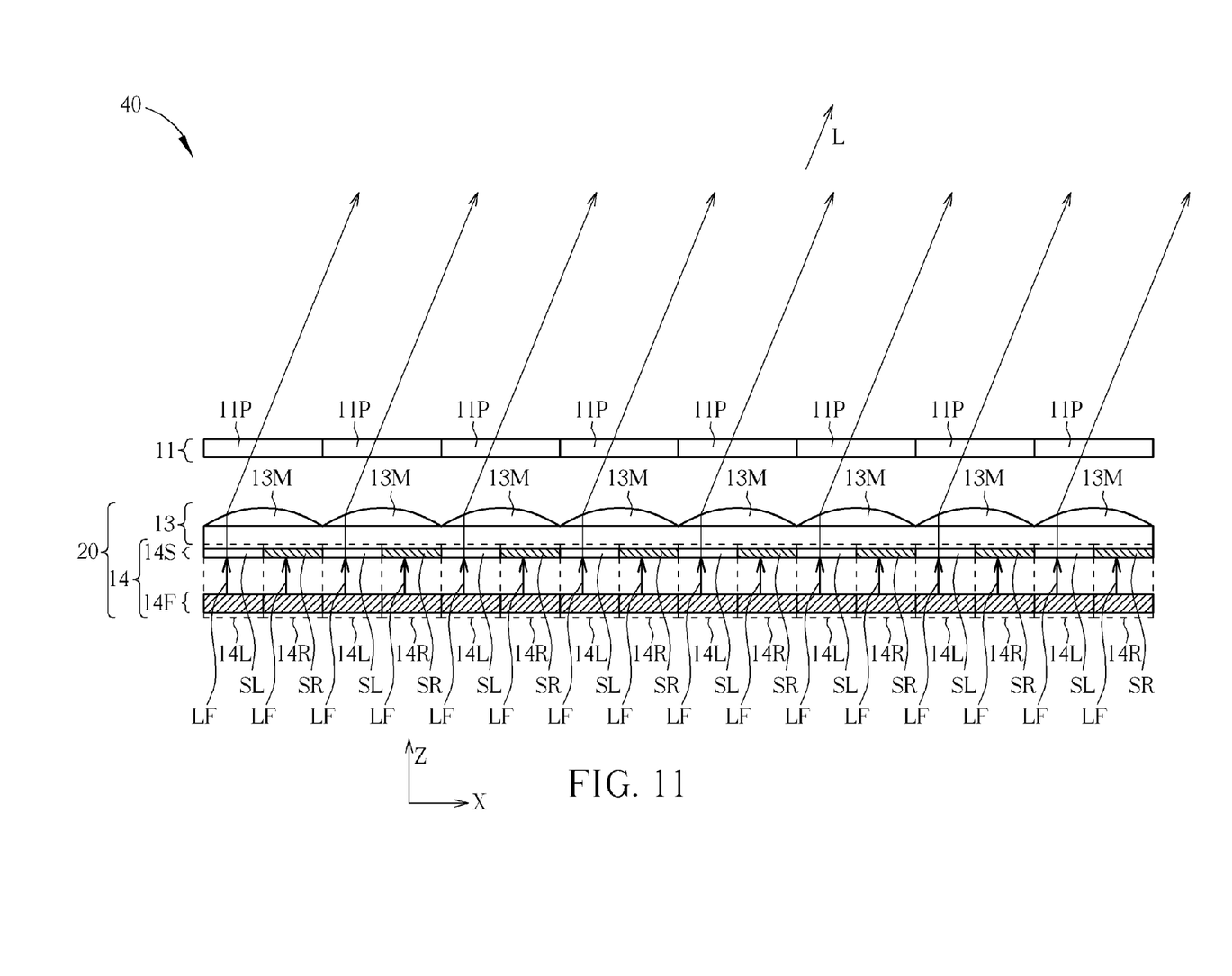
FIGS. 11-13 are schematic diagrams illustrating light providing approaches of a backlight module according to another preferred embodiment of the present invention.
Figure 12:
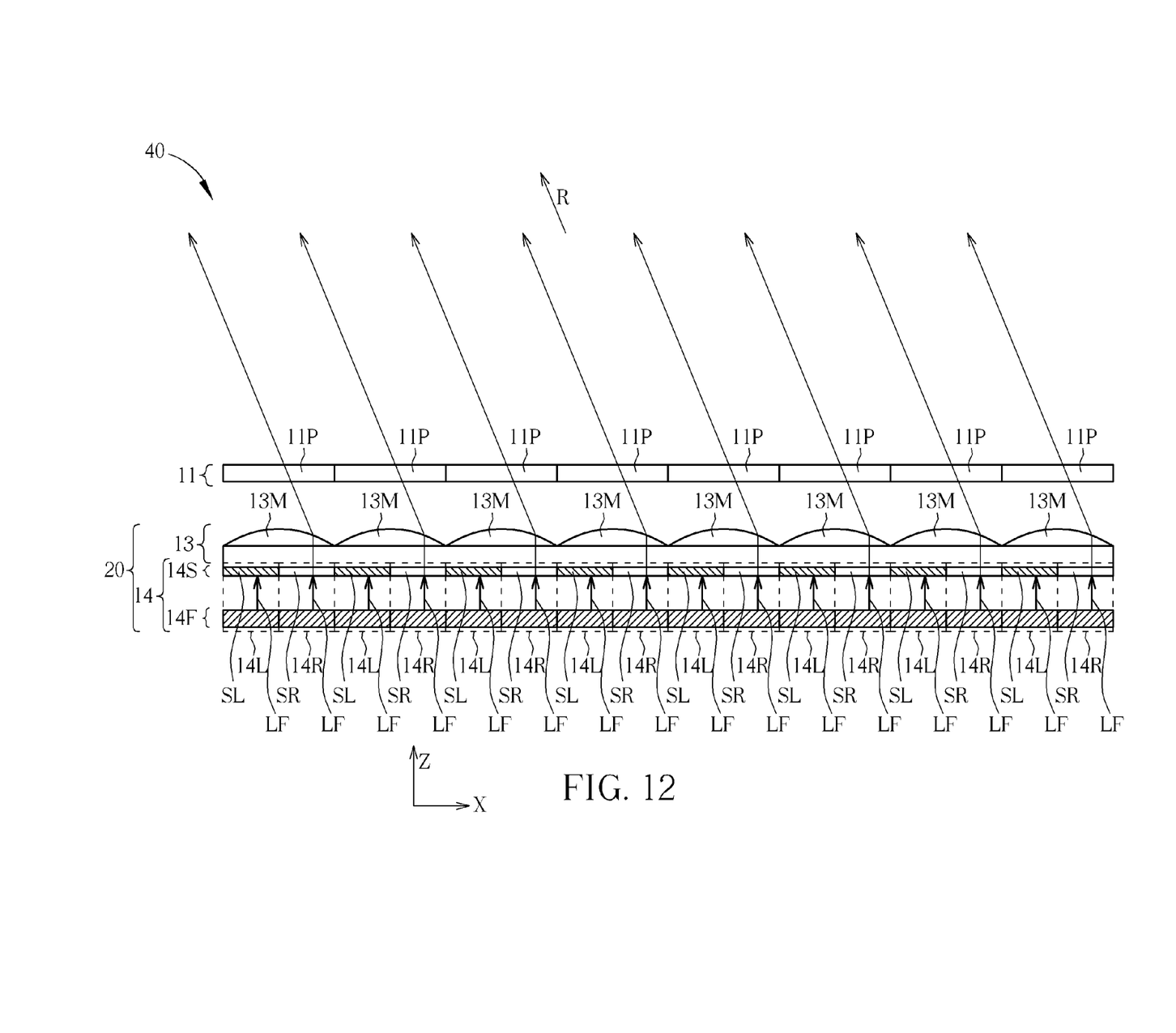
Figure 13:
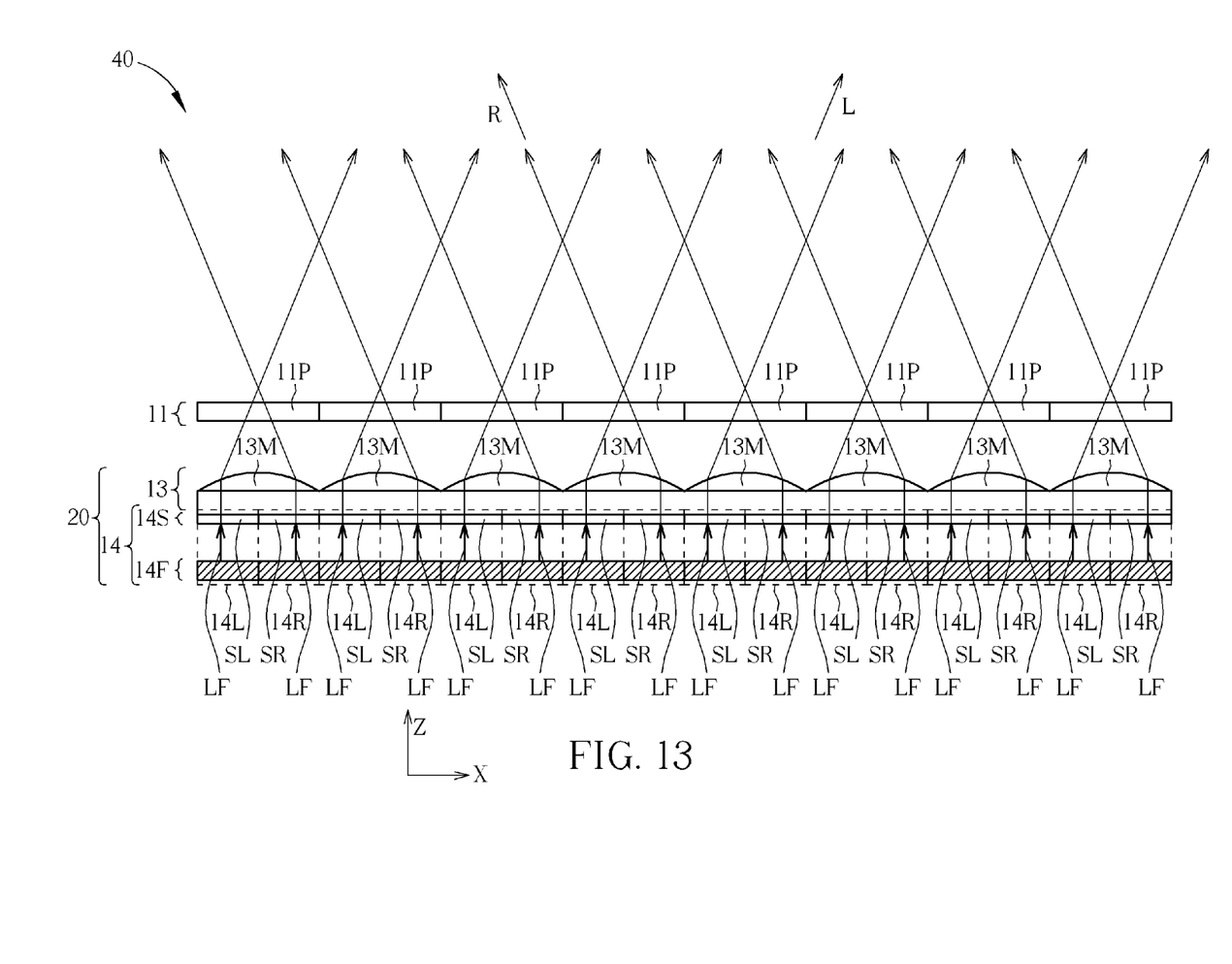

Please refer to FIGS. 11-13, which are schematic diagrams illustrating light providing approaches of a backlight module according to another preferred embodiment of the present invention. As shown in FIG. 11, each of the first luminant regions 14L may provide light in a first display direction L via a partial area of the corresponding micro-lens 13M. More specifically, in this embodiment, when each of the first barrier pixels SL corresponding to each of the first luminant regions 14L is controlled to be in the transparent display mode, light LF generated from the flat light source device 14F may pass through the first barrier pixels SL, and the light LF may be changed toward the first display direction L after passing through a partial area of the corresponding micro-lens 13M according to the optical property of the corresponding micro-lens 13M, for providing a light source in the first display direction L to the liquid crystal display panel 11. In other words, under a combination of the backlight module 20 and the liquid crystal display panel 11, the light in the first display direction L, which is generated by each of the first luminant regions 14L via the partial area of the corresponding micro-lens 13M, may be employed to present display images in the first display direction L by passing through the corresponding pixels 11P of the liquid crystal display panel 11.

According to the same rule, as shown in FIG. 12, each of the second luminant regions 14R may provide light in a second display direction R via a partial area of the corresponding micro-lens 13M. Under a combination of the backlight module 20 and the liquid crystal display panel 11, the light in the second display direction R, which is generated by each of the second luminant regions 14R via the partial area of the corresponding micro-lens 13M, may be employed to present display images in the second display direction R by passing through the corresponding pixels 11P of the liquid crystal display panel 11.

According to the above-mentioned light providing approaches of the backlight module 20 and the accompanied image switching method on the liquid crystal display panel 11, different display images may be provided to a left eye and a right eye of a viewer and a three-dimensional display effect may then be generated. Additionally, in this embodiment, the light LF may be changed toward the pixel 11P corresponding to the first luminant region 14L and the second luminant region 14R in the direction Z after passing through the first barrier pixel SL, the second barrier pixel SR, and the micro-lens 13M, for providing display images in different display directions, but the present invention is not limited to this. The relative allocations of the pixel 11P, which the light LF is led to, the optical properties of the micro-lenses 13M, the coverage condition of the micro-lenses 13M, and the distance between the micro-lenses 13M and the liquid crystal display panel 11 may be further modified for optimizing the display effect according to requirements such as varying viewing angles and varying viewing distances.

As shown in FIG. 13, in addition to the three-dimensional display effect described above, each of the first barrier pixels SL and each of the second barrier pixels SR may be controlled in the transparent display mode, and the first luminant regions 14L and the corresponding second luminant regions 14R may then be able to provide light simultaneously to the liquid crystal panel 11 for generating a two-dimensional display effect. Therefore, a display device 40 with a two-dimensional/three-dimensional switchable display feature may be obtained by combining the backlight module 20 and the liquid crystal display panel 11 in this embodiment, as shown in FIG. 9 and FIGS. 11-13. The display approaches of the display device 40, the driving approaches of the first luminant regions 14L and the second luminant regions 14R of the luminant device 14, and the accompanied image switching approaches of the pixels 11P in the liquid crystal display panel 11 are similar to those of the above-mentioned embodiment and will not be redundantly described.

To summarize all the descriptions above, in the present invention, the micro-lens array is disposed over the luminant device and the conditions of providing light from each of the luminant regions in the luminant device are controlled for providing the light sources in different display directions. All the pixels in the liquid crystal display panel may be then employed for presenting different display images for the left eye or the right eye of the viewer. Therefore, the backlight module and the display device in the present invention may provide the three-dimensional display effect with high resolution.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module, which is used to provide a backlight source for a liquid crystal display panel, the backlight module comprising:
   a luminant device, disposed under the liquid crystal display panel, the luminant device comprising a plurality of first luminant regions and a plurality of second luminant regions, wherein each of the first luminant regions and each of the second luminant regions are disposed alternately along a first direction; and
   a micro-lens array, disposed between the luminant device and the liquid crystal display panel, wherein the micro-lens array comprises a plurality of micro-lenses, and each of the micro-lenses overlaps at least one first luminant region and at least one second luminant region in a direction perpendicular to the liquid crystal display panel;
   wherein each of the first luminant regions provides light in a first display direction via a partial area of the corresponding micro-lens, and each of the second luminant regions provides light in a second display direction via a partial area of the corresponding micro-lens, wherein under a first stereoscopic display mode, a timing of providing light along the first display direction from the first luminant regions is separated from a timing of providing light along the second display direction from the second luminant regions.

2. The backlight module of claim 1, wherein each of the micro-lenses includes a lenticular lens or a linear Fresnel lens.

3. The backlight module of claim 2, wherein the first luminant regions and the second luminant regions are disposed along a second direction, which is not parallel to the first direction, and each of the micro-lenses has an axis direction parallel to the second direction.

4. The backlight module of claim 1, wherein the luminant device further comprises a plurality of light emitting units respectively disposed in the first luminant regions and the second luminant regions, and each of the light emitting units includes a light emitting diode (LED) or an organic light emitting diode (OLED).

5. The backlight module of claim 1, wherein the luminant device further comprises a flat light source device and a barrier panel, the barrier panel comprises a plurality of first barrier pixels respectively disposed in the first luminant regions and a plurality of second barrier pixels respectively disposed in the second luminant regions, and wherein each of the first barrier pixels is employed for blocking light from each of the first luminant regions, and each of the second barrier pixels is employed for blocking light from each of the second luminant regions under a stereoscopic display mode.

6. The backlight module of claim 5, wherein the barrier panel includes a liquid crystal panel.

7. The backlight module of claim 5, wherein the flat light source device includes a light source, a light guide sheet, a reflective sheet, a diffusion sheet, or at least a prism sheet.

8. The backlight module of claim 1, wherein under a second stereoscopic display mode, a timing of providing light along the first display direction from each of the first luminant regions and a timing of providing light along the second display direction from the second luminant region adjacent to the first luminant region partially overlap each other.

9. The backlight module of claim 1, wherein under a two-dimensional display mode, the first luminant regions and the second luminant regions respectively provide light along the first display direction and the second display direction simultaneously.

10. A display device, comprising
   a liquid crystal display panel; and
   the backlight module of claim 1, wherein the backlight module is disposed under the liquid crystal display panel.

11. A display device, comprising
   a liquid crystal display panel, the liquid crystal panel comprising a plurality of pixels; and
   a backlight module, disposed under the liquid crystal display panel, the backlight module comprising:
      a luminant device, disposed under the liquid crystal display panel, the luminant device comprising a plurality of first luminant regions and a plurality of second luminant regions, wherein each of the first luminant regions and each of the second luminant regions are disposed alternately along a first direction; and
      a micro-lens array, disposed between the luminant device and the liquid crystal display panel, wherein the micro-lens array comprises a plurality of micro-lenses, and each of the micro-lenses overlaps at least one first luminant region and at least one second luminant region in a direction perpendicular to the liquid crystal display panel,
      wherein each of the first luminant regions provides light in a first display direction via a partial area of the corresponding micro-lens, and each of the second luminant regions provides light in a second display direction via a partial area of the corresponding micro-lens, wherein each of the pixels overlaps one of the first luminant regions and the adjacent second luminant region along the direction perpendicular to the liquid crystal display panel.

12. The display device of claim 11, wherein each of the micro-lenses includes a lenticular lens or a linear Fresnel lens.

13. The display device of claim 12, wherein the first luminant regions and the second luminant regions are disposed along a second direction, which is not parallel to the first direction, and each of the micro-lenses has an axis direction parallel to the second direction.

14. The display device of claim 11, wherein the luminant device further comprises a plurality of light emitting units respectively disposed in the first luminant regions and the second luminant regions, and each of the light emitting units includes a light emitting diode or an organic light emitting diode.

15. The display device of claim 11, wherein the luminant device further comprises a flat light source device and a barrier panel, the barrier panel comprises a plurality of first barrier pixels respectively disposed in the first luminant regions and a plurality of second barrier pixels respectively disposed in the second luminant regions, and wherein each of the first barrier pixels is employed for blocking light from each of the first luminant regions, and each of the second barrier pixels is employed for blocking light from each of the second luminant regions under a stereoscopic display mode.

16. The display device of claim 15, wherein the barrier panel includes a liquid crystal panel.

17. The display device of claim 15, wherein the flat light source device includes a light source, a light guide sheet, a reflective sheet, a diffusion sheet, or at least a prism sheet.

18. The display device of claim 11, wherein under a first stereoscopic display mode, a timing of providing light along the first display direction from the first luminant regions is separated from a timing of providing light along the second display direction from the second luminant regions.

19. The display device of claim 11, wherein under a second stereoscopic display mode, a timing of providing light along the first display direction from each of the first luminant regions and a timing of providing light along the second display direction from the second luminant region adjacent to the first luminant region partially overlap each other.

20. The display device of claim 11, wherein under a two-dimensional display mode, the first luminant regions and the second luminant regions respectively provide light along the first display direction and the second display direction simultaneously.

* * * * *